United States Patent
Feller

(10) Patent No.: US 10,148,726 B1
(45) Date of Patent: Dec. 4, 2018

(54) INITIATING OPERATING SYSTEM COMMANDS BASED ON BROWSER COOKIES

(71) Applicant: JPMorgan Chase Bank, N.A., New York, NY (US)

(72) Inventor: Todd Stacy Leo Feller, Lewis Center, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 298 days.

(21) Appl. No.: 14/163,034

(22) Filed: Jan. 24, 2014

(51) Int. Cl.
 G06F 15/16 (2006.01)
 H04L 29/08 (2006.01)
(52) U.S. Cl.
 CPC .................... H04L 67/02 (2013.01)
(58) Field of Classification Search
 CPC ............................. H04L 63/1441; H04L 67/02
 See application file for complete search history.

(56) References Cited

U.S. PATENT DOCUMENTS

| | | |
|---|---|---|
| 3,705,385 A | 12/1972 | Batz |
| 3,860,870 A | 1/1975 | Furuya |
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |

(Continued)

FOREIGN PATENT DOCUMENTS

| | | |
|---|---|---|
| CA | 2430549 | 6/2002 |
| DE | 19731293 | 1/1999 |

(Continued)

OTHER PUBLICATIONS

ABC News Internet Ventures, Getting Smart with Java, http://abcnews.go.com/sections/DailyNews/amex_java000606.html (last visited Jun. 6, 2000).

(Continued)

*Primary Examiner* — Viet D Vu
(74) *Attorney, Agent, or Firm* — Calfee, Halter & Griswold LLP

(57) ABSTRACT

Systems and methods are disclosed for initiating operating system commands based on browser cookies. In one implementation, a processing device detects a browser cookie that includes one or more instructions to invoke at least one operating system (OS) level command. The processing device analyzes the browser cookie to identify at least one of the one or more instructions. The processing device executes the identified at least one of the one or more instructions. The processing device modifies the browser cookie based on an execution of the at least one of the one or more instructions.

10 Claims, 3 Drawing Sheets

(56) References Cited

U.S. PATENT DOCUMENTS

| | | |
|---|---|---|
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,212,792 A | 5/1993 | Gerety et al. |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,315,504 A | 5/1994 | Lembie |
| 5,317,683 A | 5/1994 | Hager et al. |
| 5,321,841 A | 6/1994 | Eat |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Chang |
| 5,479,530 A | 12/1995 | Nair et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davies et al. |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scarmer |
| 5,642,419 A | 6/1997 | Rosen |
| 5,644,493 A | 7/1997 | Motai |
| 5,644,778 A | 7/1997 | Burks et al. |
| 5,649,118 A | 7/1997 | Carlisle et al. |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,761,288 A | 4/1998 | Gray |
| 5,754,840 A | 5/1998 | Rivette |
| 5,758,126 A | 5/1998 | Daniels et al. |
| 5,758,328 A | 5/1998 | Giovannoli |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,793,861 A | 9/1998 | Haigh |
| 5,794,178 A | 9/1998 | Caid |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Kahn et al. |
| 5,828,833 A | 10/1998 | Belville et al. |
| 5,832,211 A | 11/1998 | Blakley, III et al. |
| 5,832,460 A | 11/1998 | Bednar |
| 5,832,476 A | 11/1998 | Tada |
| 5,835,580 A | 11/1998 | Fraser |
| 5,835,603 A | 11/1998 | Coutts |
| 5,838,903 A | 11/1998 | Blakley, III et al. |

(56) References Cited

U.S. PATENT DOCUMENTS

| | | |
|---|---|---|
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,190 A | 12/1998 | Kleehammer et al. |
| 5,848,400 A | 12/1998 | Chang |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakely, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,718 A | 2/1999 | Spector |
| 5,870,725 A | 2/1999 | Belinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Chang |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,952,639 A | 7/1999 | Ohki |
| 5,933,817 A | 8/1999 | Hucal |
| 5,933,823 A | 8/1999 | Cullen |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,933,816 A | 9/1999 | Zeanah |
| 5,933,827 A | 9/1999 | Cole |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | MacKenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 6,003,762 A | 11/1999 | Hayashida |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelly et al. |
| 6,001,016 A | 12/1999 | Walker et al. |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,067,531 A | 5/2000 | Daniel et al. |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |

(56) References Cited

U.S. PATENT DOCUMENTS

| | | |
|---|---|---|
| 6,091,817 A | 7/2000 | Bertina et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,642 A | 9/2000 | Brown et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,113 A | 12/2000 | Mora et al. |
| 6,161,182 A | 12/2000 | Nadooshan |
| 6,164,533 A | 12/2000 | Barton |
| 6,170,011 B1 | 1/2001 | Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,066 B1 | 3/2001 | Barkley |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthan |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,223,168 B1 | 4/2001 | McGurl et al. |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,330,543 B1 | 12/2001 | Kepecs |
| 6,332,192 B1 | 12/2001 | Boroditsky et al. |
| 6,336,104 B1 | 1/2002 | Walker et al. |
| 6,339,423 B1 | 1/2002 | Sampson et al. |
| 6,343,279 B1 | 1/2002 | Bissonette et al. |
| 6,343,323 B1 | 1/2002 | Kalpio et al. |
| 6,345,261 B1 | 2/2002 | Feidelson |
| 6,349,242 B2 | 2/2002 | Mahaffey |
| 6,349,336 B1 | 2/2002 | Sit et al. |
| 6,363,381 B1 | 3/2002 | Lee et al. |
| 6,366,682 B1 | 4/2002 | Hoffman et al. |
| 6,381,587 B1 | 4/2002 | Guzelsu |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,446,053 B1 | 9/2002 | Elliott |
| 6,449,765 B1 | 9/2002 | Ballard |
| 6,453,353 B1 | 9/2002 | Win et al. |
| 6,460,141 B1 | 10/2002 | Olden |
| 6,470,357 B1 | 10/2002 | Garcia, Jr. et al. |
| 6,484,149 B1 | 11/2002 | Jammes |
| 6,487,641 B1 | 11/2002 | Cusson et al. |
| 6,490,601 B1 | 12/2002 | Markus et al. |
| 6,493,677 B1 | 12/2002 | Von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,498,657 B1 | 12/2002 | Kuntz et al. |
| 6,507,912 B1 | 1/2003 | Matyas et al. |
| 6,510,523 B1 | 1/2003 | Perlman et al. |
| 6,519,763 B1 | 2/2003 | Kaufer et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |
| 6,592,044 B1 | 7/2003 | Wong et al. |
| 6,609,106 B1 | 8/2003 | Robertson |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |
| 6,668,322 B1 | 12/2003 | Wood et al. |
| 6,671,818 B1 | 12/2003 | Mikurak |
| 6,675,261 B2 | 1/2004 | Shandony |
| 6,684,248 B1 | 1/2004 | Janacek et al. |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |

(56) References Cited

U.S. PATENT DOCUMENTS

| | | | |
|---|---|---|---|
| 6,714,987 B1 | 3/2004 | Amin et al. | |
| 6,718,482 B2 | 4/2004 | Sato et al. | |
| 6,718,535 B1 | 4/2004 | Underwood | |
| 6,725,269 B1 | 4/2004 | Megiddo | |
| 6,735,695 B1 | 5/2004 | Gopalakrishnan et al. | |
| 6,738,779 B1 | 5/2004 | Shapira | |
| 6,751,654 B2 | 6/2004 | Massarani et al. | |
| 6,754,833 B1 | 6/2004 | Black et al. | |
| 6,755,341 B1 | 6/2004 | Wong et al. | |
| 6,763,388 B1 | 7/2004 | Tsimelzon | |
| 6,766,370 B2 | 7/2004 | Glommen et al. | |
| 6,769,605 B1 | 8/2004 | Magness | |
| 6,772,146 B2 | 8/2004 | Khemlani et al. | |
| 6,785,810 B1 | 8/2004 | Lirov et al. | |
| 6,789,115 B1 | 9/2004 | Singer et al. | |
| 6,792,572 B1 | 9/2004 | Frohlick | |
| 6,805,288 B2 | 10/2004 | Routhenstein et al. | |
| 6,810,395 B1 | 10/2004 | Bharat | |
| 6,810,410 B1 * | 10/2004 | Durham | G06F 9/44505 709/203 |
| 6,819,219 B1 | 11/2004 | Bolle et al. | |
| 6,820,202 B1 | 11/2004 | Wheeler et al. | |
| 6,826,696 B1 | 11/2004 | Chawla et al. | |
| 6,832,202 B1 | 12/2004 | Schuyler et al. | |
| 6,832,587 B2 | 12/2004 | Wampula et al. | |
| 6,847,991 B1 | 1/2005 | Kurapati | |
| 6,856,970 B1 | 2/2005 | Campbell et al. | |
| 6,868,391 B1 | 3/2005 | Hultgren | |
| 6,892,231 B2 | 5/2005 | Jager | |
| 6,907,566 B1 | 6/2005 | McElfresh et al. | |
| 6,925,481 B2 | 8/2005 | Singhal et al. | |
| 6,934,848 B1 | 8/2005 | King et al. | |
| 6,937,976 B2 | 8/2005 | Apte | |
| 6,938,158 B2 | 8/2005 | Azuma | |
| 6,950,936 B2 | 9/2005 | Subramaniam et al. | |
| 6,954,932 B2 | 10/2005 | Nakamura et al. | |
| 6,957,337 B1 | 10/2005 | Chainer et al. | |
| 6,965,939 B2 | 11/2005 | Cuomo et al. | |
| 6,976,164 B1 | 12/2005 | King et al. | |
| 6,980,962 B1 | 12/2005 | Arganbright et al. | |
| 6,983,421 B1 | 1/2006 | Lahti et al. | |
| 6,992,786 B1 | 1/2006 | Breding et al. | |
| 7,006,983 B1 | 2/2006 | Packes et al. | |
| 7,010,512 B1 | 3/2006 | Gillin et al. | |
| 7,020,696 B1 | 3/2006 | Perry et al. | |
| 7,032,110 B1 | 4/2006 | Su et al. | |
| 7,051,199 B1 | 5/2006 | Berson et al. | |
| 7,051,330 B1 | 5/2006 | Kaler et al. | |
| 7,058,817 B1 | 6/2006 | Ellmore | |
| 7,076,453 B2 | 7/2006 | Jammes et al. | |
| 7,080,036 B1 | 7/2006 | Drummond et al. | |
| 7,089,203 B1 | 8/2006 | Crookshanks | |
| 7,089,208 B1 | 8/2006 | Levchin et al. | |
| 7,089,503 B1 | 8/2006 | Bloomquist et al. | |
| 7,093,020 B1 | 8/2006 | McCarty et al. | |
| 7,093,282 B2 | 8/2006 | Hillhouse | |
| 7,103,556 B2 | 9/2006 | Del Rey et al. | |
| 7,117,239 B1 | 10/2006 | Hansen | |
| 7,124,101 B1 | 10/2006 | Mikurak | |
| 7,134,075 B2 | 11/2006 | Hind | |
| 7,137,006 B1 | 11/2006 | Grandcolas et al. | |
| 7,139,686 B1 | 11/2006 | Critz | |
| 7,185,094 B2 | 2/2007 | Marquette et al. | |
| 7,188,181 B1 | 3/2007 | Squier et al. | |
| 7,197,470 B1 | 3/2007 | Arnett | |
| 7,203,909 B1 | 4/2007 | Horvitz et al. | |
| 7,299,201 B2 | 11/2007 | Jammes | |
| 7,321,864 B1 | 1/2008 | Gendler | |
| 7,370,011 B2 | 5/2008 | Bennett | |
| 7,694,335 B1 * | 4/2010 | Turner | H04L 63/1441 708/250 |
| 9,021,110 B2 * | 4/2015 | Lyon | G06F 17/30902 709/225 |
| 9,563,684 B1 * | 2/2017 | Natanzon | G06F 17/30575 |
| 2001/0011255 A1 | 8/2001 | Asay et al. | |
| 2001/0012974 A1 | 8/2001 | Mahaffey | |
| 2001/0016835 A1 | 8/2001 | Hansmann et al. | |
| 2001/0027474 A1 | 10/2001 | Nachman et al. | |
| 2001/0029464 A1 | 10/2001 | Schweitzer | |
| 2001/0032184 A1 | 10/2001 | Tenembaum | |
| 2001/0047295 A1 | 11/2001 | Tenembaum | |
| 2001/0051917 A1 | 12/2001 | Bissonette et al. | |
| 2001/0054003 A1 | 12/2001 | Chien et al. | |
| 2001/0054059 A1 | 12/2001 | Marks et al. | |
| 2002/0002479 A1 | 1/2002 | Almog et al. | |
| 2002/0007313 A1 | 1/2002 | Mai et al. | |
| 2002/0007460 A1 | 1/2002 | Azuma | |
| 2002/0010599 A1 | 1/2002 | Levison | |
| 2002/0010668 A1 | 1/2002 | Travis et al. | |
| 2002/0018585 A1 | 2/2002 | Kim | |
| 2002/0019938 A1 | 2/2002 | Aarons | |
| 2002/0023108 A1 | 2/2002 | Daswani et al. | |
| 2002/0029269 A1 | 3/2002 | McCarty et al. | |
| 2002/0032613 A1 | 3/2002 | Buettgenbach et al. | |
| 2002/0032650 A1 | 3/2002 | Hauser et al. | |
| 2002/0059141 A1 | 5/2002 | Davies et al. | |
| 2002/0069172 A1 | 6/2002 | Omshehe et al. | |
| 2002/0077964 A1 | 6/2002 | Brody et al. | |
| 2002/0077978 A1 | 6/2002 | O'Leary et al. | |
| 2002/0087447 A1 | 7/2002 | McDonald et al. | |
| 2002/0087471 A1 | 7/2002 | Ganesan et al. | |
| 2002/0095443 A1 | 7/2002 | Kovack | |
| 2002/0099826 A1 | 7/2002 | Summers et al. | |
| 2002/0099936 A1 | 7/2002 | Kou et al. | |
| 2002/0104006 A1 | 8/2002 | Boate et al. | |
| 2002/0104017 A1 | 8/2002 | Stefan | |
| 2002/0107788 A1 | 8/2002 | Cunnhingham | |
| 2002/0143874 A1 | 10/2002 | Marquette et al. | |
| 2002/0152163 A1 | 10/2002 | Bezos et al. | |
| 2002/0156900 A1 | 10/2002 | Marquette et al. | |
| 2002/0165949 A1 | 11/2002 | Na | |
| 2002/0174010 A1 | 11/2002 | Rice, III | |
| 2002/0178113 A1 | 11/2002 | Clifford et al. | |
| 2002/0184507 A1 | 12/2002 | Makower et al. | |
| 2002/0188869 A1 | 12/2002 | Patrick | |
| 2002/0191548 A1 | 12/2002 | Ylonen et al. | |
| 2002/0198806 A1 | 12/2002 | Blagg et al. | |
| 2003/0001888 A1 | 1/2003 | Power | |
| 2003/0018915 A1 | 1/2003 | Stoll | |
| 2003/0023880 A1 | 1/2003 | Edwards et al. | |
| 2003/0034388 A1 | 2/2003 | Routhenstein et al. | |
| 2003/0037131 A1 | 2/2003 | Verma | |
| 2003/0037142 A1 | 2/2003 | Munger et al. | |
| 2003/0040995 A1 | 2/2003 | Daddario et al. | |
| 2003/0041165 A1 | 2/2003 | Spencer et al. | |
| 2003/0046587 A1 | 3/2003 | Bheemarasetti et al. | |
| 2003/0046589 A1 | 3/2003 | Gregg | |
| 2003/0051026 A1 | 3/2003 | Carter et al. | |
| 2003/0055871 A1 | 3/2003 | Roses | |
| 2003/0070069 A1 | 4/2003 | Belapurkar et al. | |
| 2003/0070084 A1 | 4/2003 | Satomaa et al. | |
| 2003/0074580 A1 | 4/2003 | Knouse et al. | |
| 2003/0079147 A1 | 4/2003 | Hsieh et al. | |
| 2003/0084345 A1 | 5/2003 | Bjornestad et al. | |
| 2003/0084647 A1 | 5/2003 | Smith et al. | |
| 2003/0088552 A1 | 5/2003 | Bennett et al. | |
| 2003/0101269 A1 * | 5/2003 | Choi | G06F 9/544 709/228 |
| 2003/0105981 A1 | 6/2003 | Miller et al. | |
| 2003/0110399 A1 | 6/2003 | Rail | |
| 2003/0115160 A1 | 6/2003 | Nowlin et al. | |
| 2003/0119642 A1 | 6/2003 | Gates et al. | |
| 2003/0149594 A1 | 8/2003 | Beazley et al. | |
| 2003/0154171 A1 | 8/2003 | Karp et al. | |
| 2003/0154403 A1 | 8/2003 | Keinsley et al. | |
| 2003/0159072 A1 | 8/2003 | Bellinger et al. | |
| 2003/0163700 A1 | 8/2003 | Paatero | |
| 2003/0163733 A1 | 8/2003 | Barriga-Caceres et al. | |
| 2003/0167229 A1 | 9/2003 | Ludwig et al. | |
| 2003/0177067 A1 | 9/2003 | Cowell et al. | |
| 2003/0191549 A1 | 10/2003 | Otsuka et al. | |
| 2003/0204460 A1 | 10/2003 | Robinson et al. | |
| 2003/0225688 A1 | 12/2003 | Dobbins | |
| 2004/0031856 A1 | 2/2004 | Atsmon et al. | |

(56) References Cited

U.S. PATENT DOCUMENTS

| | | | |
|---|---|---|---|
| 2004/0049702 A1 | 3/2004 | Subramaniam et al. | |
| 2004/0117409 A1 | 6/2004 | Scahill et al. | |
| 2004/0153378 A1 | 8/2004 | Perkowski | |
| 2004/0215514 A1 | 10/2004 | Quinlan | |
| 2004/0254991 A1 | 12/2004 | Malik et al. | |
| 2005/0080747 A1 | 4/2005 | Anderson et al. | |
| 2005/0082362 A1 | 4/2005 | Anderson et al. | |
| 2005/0086160 A1 | 4/2005 | Wong et al. | |
| 2005/0086177 A1 | 4/2005 | Anderson et al. | |
| 2005/0091126 A1 | 4/2005 | Junger | |
| 2005/0120180 A1 | 6/2005 | Schornbach et al. | |
| 2005/0193056 A1 | 9/2005 | Schaefer et al. | |
| 2005/0278641 A1 | 12/2005 | Mansour et al. | |
| 2006/0029261 A1 | 2/2006 | Hoffman et al. | |
| 2006/0116949 A1 | 6/2006 | Wehunt et al. | |
| 2006/0274970 A1 | 12/2006 | Seki et al. | |
| 2007/0094654 A1* | 4/2007 | Costea | G06F 8/65 717/168 |
| 2007/0106670 A1* | 5/2007 | Yoakum | H04L 67/14 |
| 2008/0021866 A1* | 1/2008 | Hinton | G06Q 10/10 |
| 2012/0324336 A1* | 12/2012 | Maeda | H04N 1/00464 715/234 |
| 2014/0136638 A1* | 5/2014 | Zhang | H04L 51/04 709/206 |
| 2015/0310483 A1* | 10/2015 | Kent | G06Q 30/0273 705/14.45 |
| 2015/0347374 A1* | 12/2015 | Rehtijarvi | G06F 17/30091 715/747 |

FOREIGN PATENT DOCUMENTS

| | | |
|---|---|---|
| EP | 855659 | 7/1998 |
| EP | 884877 | 12/1998 |
| EP | 917119 | 5/1999 |
| EP | 1014318 | 6/2000 |
| EP | 1022664 | 7/2000 |
| EP | 1056043 | 11/2000 |
| EP | 1089516 | 4/2001 |
| JP | 10187467 | 7/1998 |
| JP | 2003-24329 | 11/2000 |
| JP | 2001-134672 | 5/2001 |
| JP | 2005-242976 | 9/2005 |
| WO | 97/43736 | 11/1997 |
| WO | 99/40507 | 8/1999 |
| WO | 99/52051 | 10/1999 |
| WO | 00/68858 | 11/2000 |
| WO | 01/18656 | 3/2001 |
| WO | 01/35355 | 5/2001 |
| WO | 01/43084 | 6/2001 |
| WO | 01/88659 | 11/2001 |
| WO | 02/17082 | 2/2002 |
| WO | 2004/079603 | 9/2004 |

OTHER PUBLICATIONS

Amy Cortese et al, Cyberspace: Crafting software that will let you build a business out there, Bus. Week, Feb. 27, 1995, at 78.
Amy K. Larsen, Internet Goes to Work for Builders, InternetWeek, Nov. 16, 1998, at 26.
Anne Knowles, Improved Internet security enabling on-line commerce, PC Week, Mar. 20, 1995.
Anne Thomas, Sun Microsystems, Enterprise Javabeans Technology, http://java.sun.com (last visited May 21, 1999).
Associates National Bank (Delaware), Our Cards, http://www.theassociates.com (last visited Apr. 6, 1999).
Aversion Therapy: Banks overcoming fear of the 'Net to develop safe Internet-based payment system with Netscape Communicator, Network World, Dec. 12, 1994.
Barry D. Bowen, Sun Microsystems, Banking on JAVA Technology, http://java.sun.com (last visited May 21, 1999).
Bechtel Construction Operations Incorporated Standardizes on Primavera's Expedition Contract Management Software, Bus. Wire, Jul. 27, 1999.
Calyx Software, POINT for Windows Version 3.x Interface Marketing Guide (Dec. 8, 1999).
David Bank, Cash, Check, Charge—what's next?, Seattle Times, Mar. 6, 1995, at D-1.
David D. Owen, Facilities Planning and Relocation 108, 110, 112-114, 117-127, 137-138, 199-217, 241, 359 (R.S. Means Company, Inc. 1993).
David G. Cotts, The Facility Management Handbook 135-40 (2d ed. 1998).
David P. Kormann et al, Risks of the Passport Single Signon Protocol, 33 Computer Networks 51-58 (2000).
David Post, E-Cash: Can't Live With It, Can't Live Without It, Am. Lawyer, Mar. 1995, at 116.
Dominique Deckmyn, San Francisco Manages $45M Project Via Web-Based Service, ComputerWorld, Aug. 9, 1999, at 14.
Don Clark, Microsoft, Visa to Jointly Develop PC Electronic-Shopping Software, Wall St. J., Nov. 9, 1994, at B9.
ECharge Corporation, http://www.echarge.com/company/index.htm (last visited Dec. 3, 1999).
FreeMarkets Online, Inc., http://www.freemarkets.com (last visited Apr. 1999).
G&D America's Multi-application Smart Card Selected for Combined Payroll and 'Virtual Banking' Program in Mexico, Bus. Wire, Apr. 24, 1998.
GE TPN Post Service Use Guidelines, Getting Started (Apr. 26, 1999).
GE TPN Post Service Use Guidelines, Resource Center (Apr. 26, 1999).
Gerry Vandenengel, Cards on the Internet: Advertising on a $3 Bill, World Card Tech., Feb. 1995, at 46.
Harris InfoSource, http://www.harrisinfo.com (last visited Apr. 26, 1999).
Hewlett-Packard Co., Understanding Product Data Management (Apr. 26, 1999).
Jeffrey Kutler, A different drummer on the data highway, Am. Banker, May 12, 1995, at 14.
Jeffrey Kutler, Cash Card Creator Looking Beyond Mondex, Am. Banker, Feb. 9, 1995, at 16.
John N. Frank, Beyond direct mail, Credit Card Mgmt., Aug. 1996, at 54.
Jonathan Berry et al, Database: A Potent New Tool for Selling, Bus. Week, Sep. 5, 1994, at 56.
Karen Epper, A player goes after big bucks in cyberspace, Am. Banker, May 5, 1995, at 17.
Keith Brown, The Builders Revolution, BuildNet Publishing (1996).
Kennedy Maiz, Fannie Mae on the Web, Newsbyte, May 8, 1995.
Kim A. Strassel, Dutch Software Concern Experiments with Electronic 'Cash' in Cyberspace, Wall St. J., Apr. 17, 1995, at B6.
Ko Fujimura et al, A World Wide Supermarket Scheme Using Rights Trading System, Proc. 7th Int'l Conf. on Parallel and Distributed Systems: Workshops, pp. 289-294 (Jul. 2000).
Ko Fujimura et al, XML Voucher: Generic Voucher Language, Internet Engineering Task Force, http://www.
Lester D. Taylor, Telecommunications Demand Analysis in Transition, IEEE Proc. 31st Int'l Conf. on System Sciences, pp. 409-415 (1998).
Lynda Radosevich, Is workflow working?, CNN.com (Apr. 6, 1999), http://www.cnn.com/TECH/computing/9904/06/workflow.ent.idg.
M. Alshawi et al, An IFC Web-Based Collaborative Construction Computer Environment: Wisper, Proc. Int'l Conf. Construction IT (1999).
Markus Jakobsson et al, Secure and lightweight advertising on the Web, 31 Computer Networks 1101-1109 (1999).
Marvin Sirbu et al, NetBill: An Internet Commerce System Optimized for Network Delivered Services, IEEE Personal Comm., pp. 34-39 (Aug. 1995).
Mary C. Lacity et al, The Information Systems Outsourcing Bandwagon, 35 Sloan Mgmt. Rev. 73 (1993).
Method of Protecting Data on a Personal Computer, IBM Technical Disclosure Bulletin 26:6, p. 2530 (Nov. 1985).
Muse Technologies, Inc., http://www.musetechnologies.com (last visited Apr. 26, 1999).

(56) References Cited

OTHER PUBLICATIONS

Nelson E. Hastings et al, A Case Study of Authenticated and Secure File Transfer: The Iowa Campaign Finance Reporting System (ICFRS), Performance, Computing and Comm. Conf., pp. 532-538 (Feb. 1997).
Object Management Group, CORBA for Beginners, http://www.omg.org (last visited May 25, 1999).
Object Management Group, CORBA Overview, http://pent21.infosys.tuwein.ac.at (last visited May 25, 1999).
Object Management Group, Library, http://www.omg.org (last visited May 25, 1999).
Object Management Group, What is CORBA?, http://www.omg.org (last visited May 25, 1999).
Omware, Inc., http://web.archive.org/web/20000226033405/www.omware.com/products.html (last visited Nov. 28, 2005).
Paul Seibert, Facilities Planning & Design for Financial Institutions 15, 272, 274-77 (1996).
Philip Carden, The New Face of Single Sign-On, Network Computing (Mar. 22, 1999), http://www.networkcomputing.com/1006/1006f1.html.
Primavera Systems Delivers Expedition Express, Bus. Wire, Feb. 23, 1999.
Primavera Systems, Inc., Expedition Contract Control Software Version 6.0 User's Guide (1998).
Primavera Systems, Inc., http://www.primavera.com (1999).
Primavera Systems, Inc., Primavera and PurchasePro.com to Create E-Commerce Marketplace for Construction Industry, Sep. 21, 1999, available at http://web.archive.org/web/2000412175935/http://www.purchasepro.com (last visited Jun. 23, 2005).
Product Data Integration Technologies, Inc., http://www.pdit.com (last visited Apr. 26, 1999).
Richard Mitchell, Netlink Goes After an Unbanked Niche, Card Tech., Sep. 1999, at 22.
Robert Barnham, Network brings together producers and companies, Feb. 1, 1994, at 80.
Roberta Fusaro, Builders moving to Web tools, ComputerWorld, Nov. 16, 1998, at 51.
Robyn Meredith, Internet bank moves closer to virtual reality, USA Today, May 5, 1995, at B1.
Safe Single-Sign-On Protocol with Minimal Password Exposure No-Decryption, and Technology-Adaptivity, IBM Technical Disclosure Bulleting 38:3, pp. 245-248 (Mar. 1995).
Server/Applet/HTML Authentication Process with Single Sign-On, IBM Research Disclosure 429128, pp. 163-165 (Jan. 2000).
Shimon-Craig Van Collie, Construction Loan Tool from PriMerit, New Trend, Bank Mgmt., Apr. 1990, at 60.
Siebel Systems, Inc., http://www.siebel.com (last visited Nov. 17, 1999).
SmartAxis bv, http://www.smartaxis.co.uk/seller/howitworks.html (last visited Feb. 23, 2001).
Steven Marlin, Chasing document management, Inform, pp. 76-82 (Apr. 1999).
Stuart J. Johnston, Pondering Passport: Do you trust microsoft with you data?, PC World, Sep. 24, 2001.
Sun Microsystems, Applets, http://java.sun.com (last visited May 21, 1999).
Sun Microsystems, JAVA Remote Method Invocation Interface, http://java.sun.com (last visited May 21, 1999).
Sun Microsystems, JAVA Servlet API, http://java.sun.com (last visited May 21, 1999).
Sun Microsystems, JAVA Technology in the Real World, http://java.sun.com (last visited May 21, 1999).
Sun Microsystems, JNDI Overview, http://java.sun.com (last visited May 21, 1999).
Sun Microsystems, Staying in Touch with JNDI, http://java.sun.com (last visited May 21, 1999).
Sun Microsystems, The JDBC Data Access API, http://java.sun.com (last visited May 21, 1999).
Temporary Global Passwords, IBM Technical Disclosure Bulletin 26:3, pp. 451-453 (Mar. 1993).
The check is in the E-mail, Info. Today, Mar. 1, 1995, at 43.
ThomasNet, Inc., http://www.thomasnet.com (last visited Apr. 26, 1999).
ThomasNet, Inc., SoluSource for Engineers by Engineers, http://www.solusource.com (last visited Apr. 26, 1999).
Timothy M. Chester, Cross-Platform Integration with XML and SOAP, IP Pro, pp. 26-34 (Sep./Oct. 2001).
Tom Jepsen, SOAP Cleans up Interoperability Problems on the Web, IT Pro, pp. 52-55 (Jan./Feb. 2001).
Tomas Hernandez Jr., Software Solutions, Building Design & Construction, Nov. 1999, at 38.
U.S. Small Business Administration, PRO-Net, www.sba.gov (last visited Jun. 8, 1999).
V. Ryan et al, Internet Engineering Task Force, Schema for Representing CORBA Objects in an LDAP Directory (work in progress), http://tools.ietf.org/html/draft-ryan-corba-schema-00 (Apr. 15, 1999).
Vanessa Houlder, OFT gives the individual top priority, Fin. Times, Jun. 8, 1994.
VISA International, Consortium Created to Manage Common Electronic Purse Specifications, http://www.visa.com/av/news/PRmisc051199.vhtml (last visited Feb. 23, 2001).
W. Richard Mosig Jr., Software Review: The Construction Project Manager, Cost Engineering, Jan. 1996, at 7.
Wingspan Bank, At Your Request, http://www.wingspanbank.com (last visited Aug. 10, 1999).

\* cited by examiner

INITIATING OPERATING SYSTEM COMMANDS BASED ON BROWSER COOKIES

TECHNICAL FIELD

Aspects and implementations of the present disclosure relate to data processing, and more specifically, to initiating operating system commands based on browser cookies.

BACKGROUND

Cookies are data items stored in a file by a web browser when a user visits a website. When the user browses the same website in the future, the data stored in the cookie can be sent back to the website by the browser to notify the website of the user's previous activity.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device detects a browser cookie that includes one or more instructions to invoke at least one operating system (OS) level command. The processing device analyzes the browser cookie to identify at least one of the one or more instructions. The processing device executes the identified at least one of the one or more instructions. The processing device modifies the browser cookie based on an execution of the at least one of the one or more instructions.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
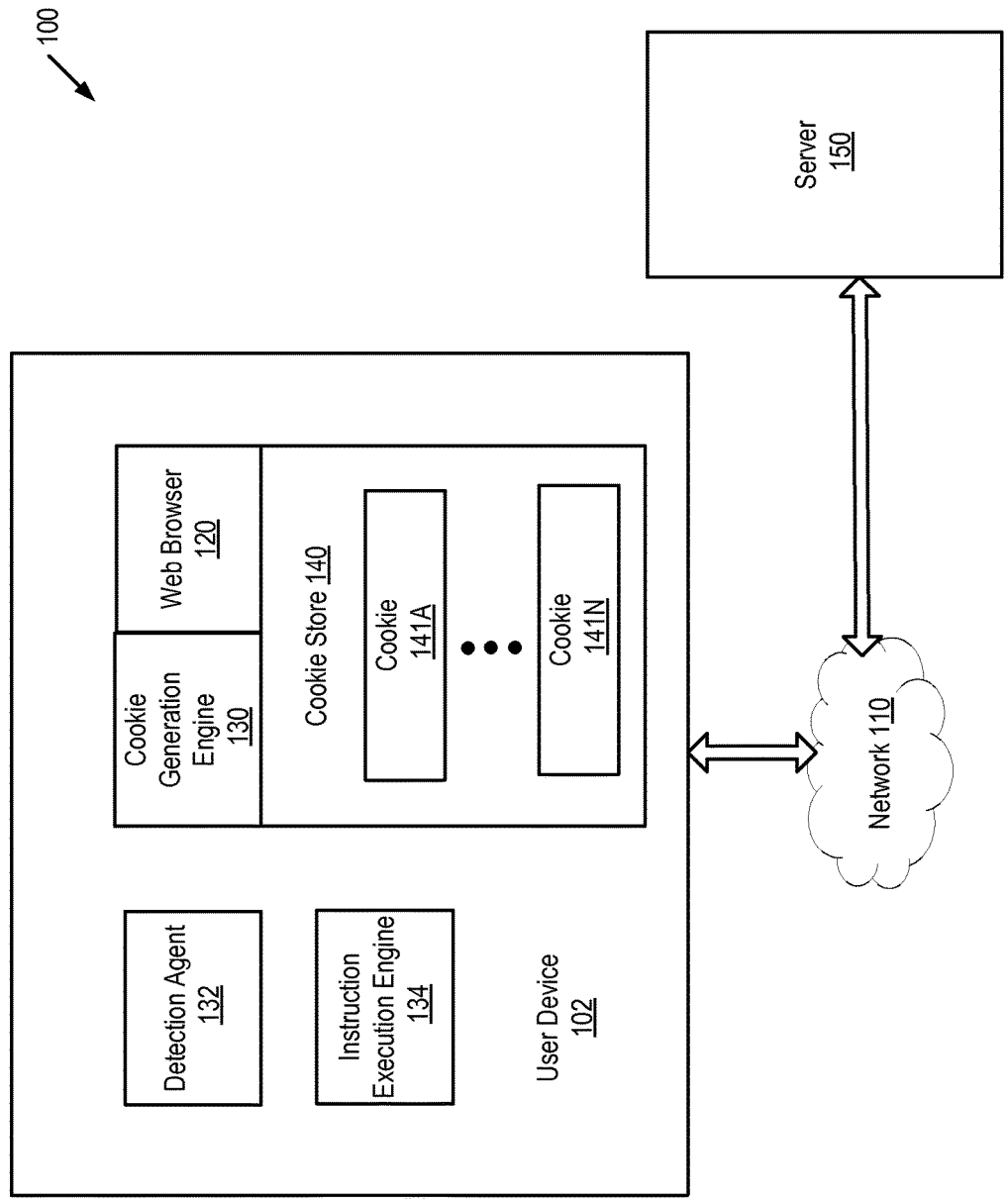
FIG. 1 depicts an illustrative system architecture, in accordance with aspects and implementations of the present disclosure.

Aspects and implementations of the present disclosure are directed to initiating operating system commands based on browser cookies.

Many web applications are configured and/or restricted to run within a protected space (e.g., a web browser) and thus cannot readily communicate with an operating system on which the browser executes due to possible security threats. While technologies such as ActiveX and Java may be used to provide communication between a browser and an underlying OS, such technical implementations often require a complex infrastructure and introduce their own respective security vulnerabilities. In addition, not all web browsers provide support a particular technical implementation (e.g., ActiveX). As such, applications running under a particular user context may not have privileges needed to perform various activities (e.g., to communicate with an operating system, etc.).

As described herein, an application running in a web browser (independent of the particular browser type, platform, etc.) can enable communication with an underlying operating system using specially formatted cookies. For example, a user may perform an activity in a web application that causes a browser to write instructions in a predetermined proprietary syntax into a custom cookie on local computer system/user device. Such instructions, for example, may invoke particular application(s) and/or OS commands associated with the user activity (e.g., to install a new application, install a software update, etc.).

As also described herein, an agent application residing on a local system/user device can be configured to detect the creation and/or presence of the specially formatted cookie. The agent can also be configured to understand and process the instructions written in the predetermined proprietary syntax. In one example, the agent can be configured to provide unrestricted access to the underlying operating system.

In certain implementations, the agent can open and/or parse a detected cookie to determine the requested action(s) that were written to the cookie by the browser. Such requested action(s) can then be performed/executed, such as by using privileges available to the agent and/or other applications. For example, the installation and/or update of various software applications can be initiated and executed on a user device via a web application in such a manner. The activities invoked by the agent may be performed in the foreground of a user session or in the background as the user session continues.

In certain implementations, by writing information to the same (or another) cookie in the predetermined proprietary syntax, various responses (e.g., status information or other messages) can be provided to the web application. For example, additional information can be written to a cookie to confirm receipt of a request, to provide one or more status updates, and/or to transmit other information to the web application. By way of illustration, the web application can periodically check for updates to the referenced cookie(s) using AJAX or another similar technology.

Moreover, in certain implementations, a local application (e.g., an application executing on a user device) can be configured to generate and update specially formatted cookies having instructions written in the predetermined proprietary syntax. Web-based applications running in a browser may then detect the cookies and process the instructions contained therein. In another example, a digital signature may be applied to a specially formatted cookie to allow authentication and/or validation of its source.

Accordingly, as described herein, bidirectional browser-OS communication and interoperability can be achieved with very little overhead. The technologies described herein may be implemented using practically any browser on practically any platform, and thereby reducing the complexity of developing and maintaining web applications, for example, in large enterprise environments.

FIG. 1 depicts an illustrative system architecture 100, in accordance with one implementation of the present disclosure. The system architecture 100 includes user device 102 and server 150. These various elements or components can be connected to one another via network 110, which can be a public network (e.g., the Internet), a private network (e.g., a local area network (LAN) or wide area network (WAN)), or a combination thereof.

User device 102 can be a wireless terminal (e.g., smartphone, etc.), personal computers (PC), laptop, tablet computer, or any other computing or communication device. User device 102 may run an operating system (OS) that manages hardware and software of the user device. Various applications, such as mobile applications ('apps'), web browser(s) 120, etc. may run on the user device (e.g., on the OS of the user device), such as in a manner known to those of ordinary skill in the art.

In certain implementations, user device 102 can also include cookie store 140. Cookie store 140 can be hosted by or on one or more storage devices, such as main memory, magnetic or optical storage based disks, tapes or hard drives, NAS, SAN, and so forth. In some implementations, cookie store 140 can be a network-attached file server, while in other implementations cookie store 140 can be some other type of persistent storage such as an object-oriented database, a relational database, and so forth, and can include one or more cookies 141A-141N. In certain implementations, cookies 141A-141N can include and/or be composed of/generated by a proprietary syntax, such as by cookie generation engine 130 in conjunction with web browser 120. As described in detail herein, such cookies 141 can be stored in cookie store 140 and subsequently detected at user device 102 by detection agent 132. Based on such a detection, instruction execution engine 134 can initiate and/or execute one or more operations, such as are dictated by the cookie(s). In doing so, various operation(s) can be initiated and/or performed at device 102 based on such cookies. It should be noted that further aspects of the operations of certain components of user device 102 are described in more detail below with respect to FIG. 2. It should also be noted that the various components described and/or referenced herein can be combined together or separated in further components, according to a particular implementation (for example, various components of user device 102 may run on separate machines).

Server 150 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. As described herein, server 150 can be, for example, a web server, application server, etc., which is capable of interaction with web browser 120 on user device 102 (e.g., via network 110), such as in a manner known to those of ordinary skill in the art.

Figure 2:
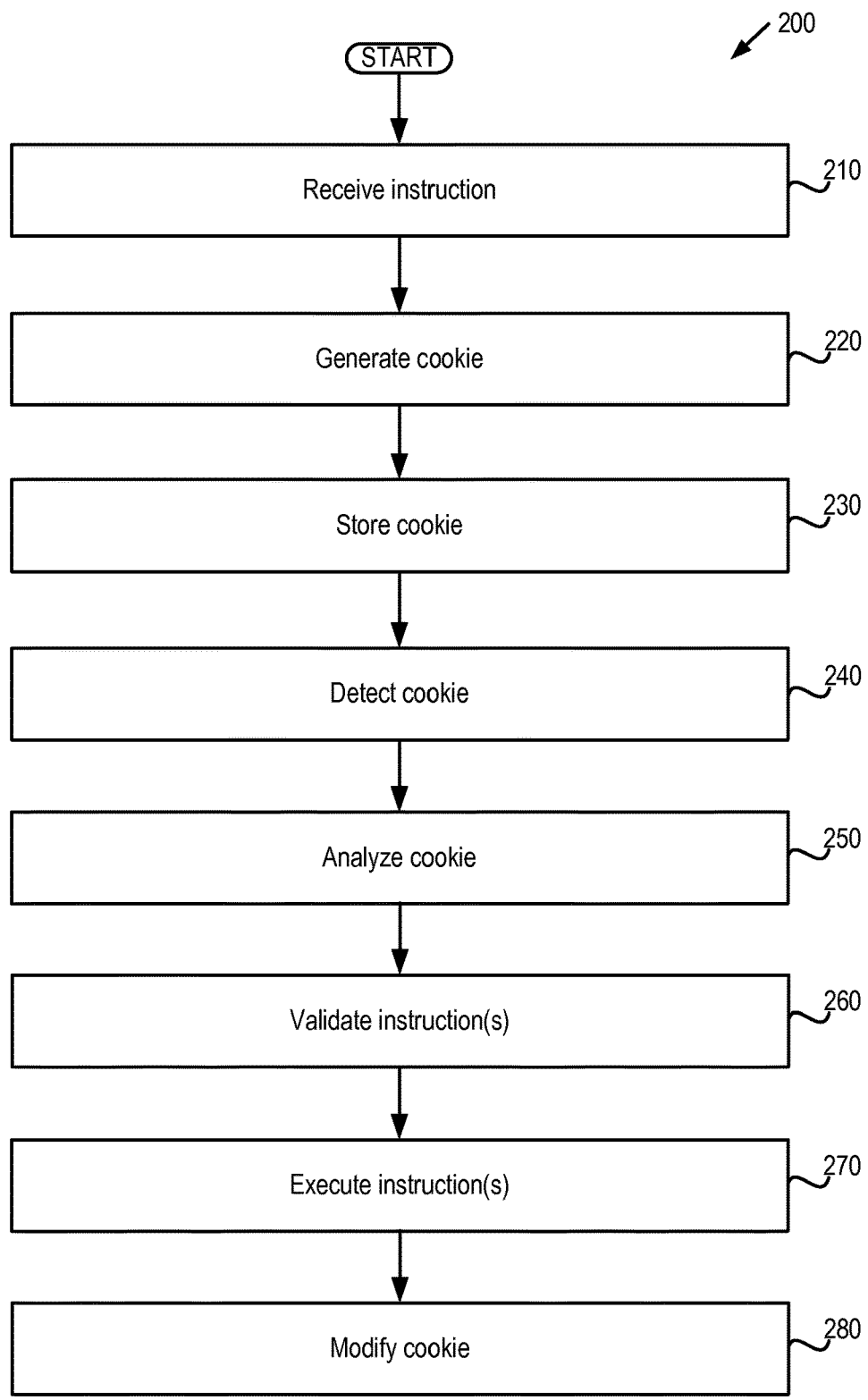
FIG. 2 depicts a flow diagram of aspects of a method for initiating operating system commands based on browser cookies in accordance with aspects and implementations of the present disclosure.

FIG. 2 depicts a flow diagram of aspects of a method 200 for initiating operating system commands based on browser cookies. The method is performed by processing logic that may comprise hardware (circuitry, dedicated logic, etc.), software (such as is run on a general purpose computer system or a dedicated machine), or a combination of both. In one implementation, the method is performed by user device 102 of FIG. 1, while in some other implementations, one or more blocks of FIG. 2 may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, an instruction can be received. In certain implementations, such an instruction can be received at a web browser 120, such as a web browser executing on a user device 102. By way of illustration, such an instruction can be received from a web application running in the web browser and/or can originate from server 150 and be received via network 110. For example, a web application running in a web browser 120 on user device 102 can provide an instruction to the web browser to install and/or update one or more applications on the user device. In certain implementations, such an instruction can be to generate and/or update one or more browser cookie(s) 141 that correspond to and/or reflect such an instruction. In one aspect, block 210 is performed by web browser 120.

At block 220, a browser cookie 141 can be generated. In certain implementation, such a browser cookie can be generated based on one or more instructions received at a web browser 120 (e.g., from a web application), such as the instruction(s) received at block 210. In certain implementations, such a browser cookie can include one or more instructions that, when executed, can invoke one or more operating system (OS) level command(s) (e.g., to install an application on user device 102, update an application already installed on the device, etc.). In one aspect, block 220 is performed by cookie generation engine 130.

It should be noted that, in certain implementations one or more instructions (and/or the cookie itself) can be written in a proprietary syntax. Such a syntax can be configured such that it can only be properly generated via trusted components (e.g., cookie generation engine 130) and/or properly interpreted/executed via trusted components (e.g., instruction execution engine 134).

At block 230, a browser cookie 141 (such as the browser cookie generated at block 220) can be stored. In certain implementations, such a browser cookie can be stored within a cookie repository such as cookie store 140 together with other browser cookies (e.g., within the same folder, file structure, etc.). In other implementations, such a browser cookie (e.g., a browser cookie generated based on instructions such as those received at block 220) can be stored separately from other browser cookies (e.g., within another folder, file structure, etc.). In one aspect, block 230 is performed by cookie generation engine 130.

At block 240, a browser cookie can be detected. In certain implementations, such a browser cookie can be detected by detection agent 132, which can be an application, module, etc., executing on user device 102. As described herein, such a detection agent 132 can scan and/or monitor (e.g., periodically, on an ongoing/constant basis, and/or in response to one or more events, triggers, etc.) one or more files, folders, file systems, etc. (including but not limited to cookie store 140) for browser cookies. Moreover, in certain implementations such a detection agent 132 can be configured to monitor for cookies including and/or being composed in a proprietary syntax, such as that described herein. In one aspect, block 240 is performed by detection agent 132.

At block 250, the browser cookie can be analyzed. For example, having detected (such as at block 240) a browser cookie (e.g., a browser cookie containing instructions in a proprietary syntax), such a detected cookie can be processed or otherwise analyzed. In doing so, one or more of the instructions incorporated within the browser cookie can be identified (such as instructions composed or encoded in the proprietary syntax). Examples of such instructions include but are not limited to instructions to install an application on user device 102, to update an existing application already installed on the device, etc. In one aspect, block 250 is performed by instruction execution engine 134.

At block 260, one or more of the instructions (such as the instructions identified at block 250) can be validated. That is, it can be appreciated that, prior to executing instructions included within such a cookie 141, it can be advantageous to validate one or more aspects of the cookie and/or the instructions, such as in order to ensure that such instructions (and/or the cookie itself) originated from a trustworthy source, that the integrity of the instructions has been maintained, etc. In doing so, for example, the browser cookie can be parsed to validate that the instructions conform to a proprietary syntax (it should be noted that, in certain implementations, such a proprietary syntax can be configured such that any unauthorized modifications to the incorporated instructions will not conform to the syntax and can thus be detected via such a validation operation). In one aspect, block 260 is performed by instruction execution engine 134.

At block 270, one or more of the instructions (such as the instructions identified at block 250 and/or those validated at block 260) can be executed. For example, having validated (such as at block 260) one or more of the instructions, such instruction(s) can be executed at user device 102, thereby installing an application (for example) or otherwise performing a corresponding or resulting operation, such as in a manner known to those of ordinary skill in the art. In one aspect, block 270 is performed by instruction execution engine 134.

At block 280, the browser cookie can be modified. That is, in addition to providing instructions that can be executed by user device 102, the referenced cookies can be utilized to track or otherwise maintain various statuses, etc., associated with such instructions. For example, in certain implementations the cookie can be modified based on an execution of one or more instructions (such as the instructions identified at block 250 and/or those validated at block 260), such as by updating the browser cookie (e.g., the content of the browser cookie, such as in a manner consistent with the proprietary syntax) based on a successful and/or unsuccessful execution of one or more of the instructions (such as at block 270). In one aspect, block 280 is performed by instruction execution engine 134.

Additionally, in certain implementations the browser cookie can be updated with a status indication. Such a status indication can reflect, for example, a current state of an application associated with the cookie (e.g., the current version of the application to which the cookie corresponds).

Figure 3:
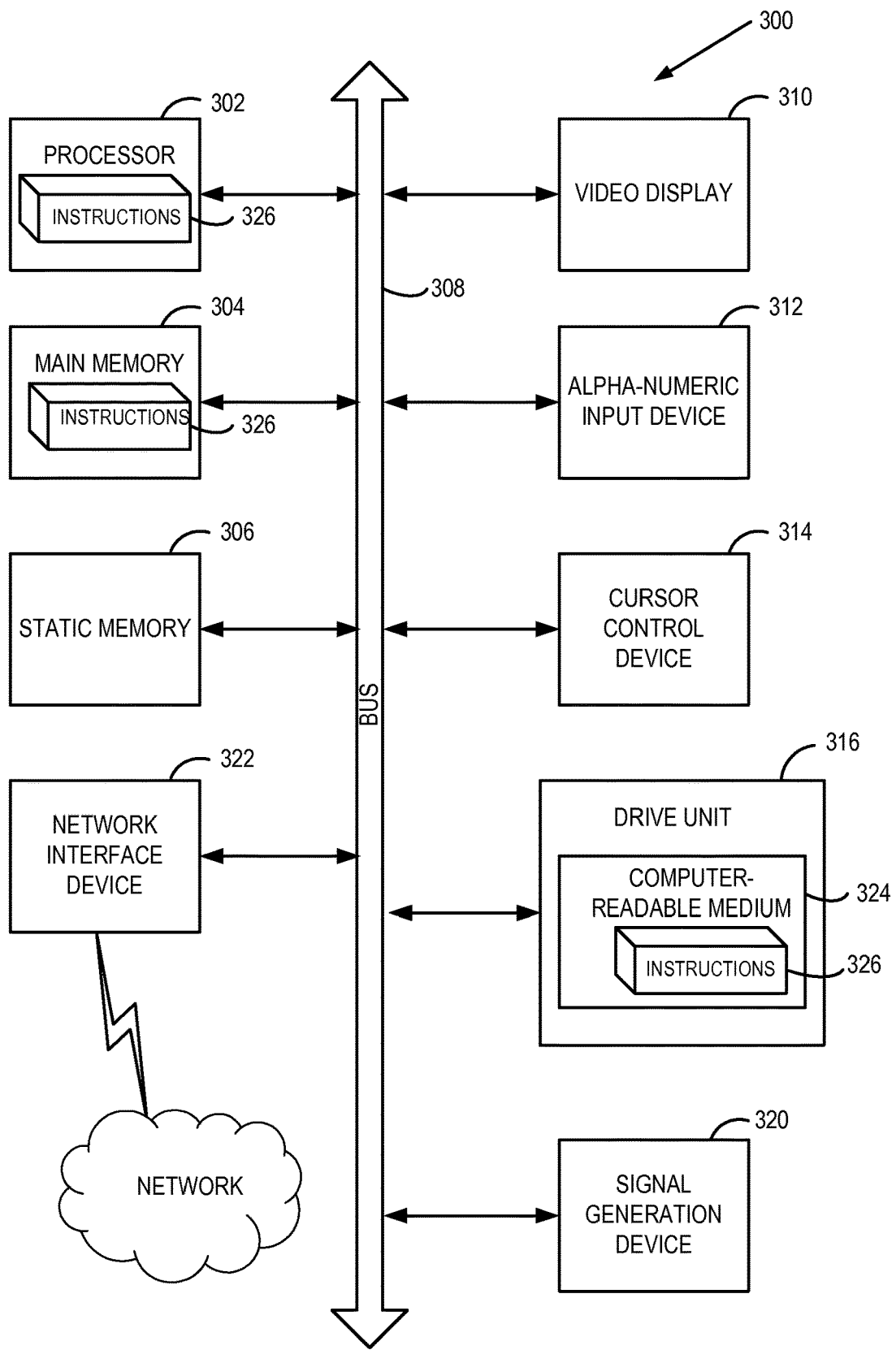
FIG. 3 depicts a block diagram of an illustrative computer system operating in accordance with aspects and implementations of the present disclosure.

FIG. 3 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions executed by collaboration manager 225, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "storing," "detecting," "analyzing," "validating," "executing," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, those described and/or referenced herein. The scope of the disclosure should, therefore, be determined with reference to the appended claims, along with the full scope of equivalents to which such claims are entitled.

What is claimed is:

1. A computer-implemented method for executing an operating system (OS) level command to install a new software application or install an updated software application on a user device, the method comprising:
    executing a web application in a web browser on the user device;
    generating a browser cookie comprising one or more instructions to invoke at least one OS-level command to install a new software application or install an updated software application on the user device, the browser cookie being generated by the web browser in response to executing the web application;
    detecting the browser cookie using a processor of the user device;
    storing the browser cookie on the user device;
    analyzing the browser cookie with the processor of the user device to identify at least one of the one or more instructions;
    validating the at least one of the one or more instructions by parsing the browser cookie to confirm that the one or more instructions conform to a proprietary syntax;
    executing the identified at least one of the one or more instructions using the processor of the user device to invoke the at least one OS-level command based on the one or more instructions from the browser cookie to install the new software application or install the updated software application on the user device; and
    modifying the browser cookie stored on the user device using the processor of the user device based on an execution of the at least one of the one or more instructions of the browser cookie in order to store status information regarding the attempt to install the new software application or install the updated software application.

2. The method of claim 1, wherein generating the browser cookie comprises receiving, at the web browser, an instruction to generate the browser cookie.

3. The method of claim 2, wherein the instruction received at the web browser is received from a web application running in the web browser.

4. The method of claim 1, wherein modifying the browser cookie comprises modifying the browser cookie based on a successful execution of the at least one of the one or more instructions to install the new software application or install the updated software application.

5. The method of claim 1, wherein modifying the cookie comprises modifying the cookie based on an unsuccessful execution of the at least one of the one or more instructions to install the new software application or install the updated software application.

6. A system for executing an operating system (OS) level command to install a new software application or install an updated software application on a user device, the system comprising:
    a memory; and
    a processing device executing instructions on the user device, the processing device coupled to the memory, and configured to:
        execute a web application in a web browser on the user device;

generate a browser cookie comprising one or more instructions to invoke at least one OS-level command to install the new software application or install the updated software application on the user device;

detect the browser cookie;

store the browser cookie on the user device;

analyze the browser cookie to identify at least one of the one or more instructions;

validate the at least one of the one or more instructions by parsing the browser cookie to confirm that the one or more instructions conform to a proprietary syntax;

execute the identified at least one of the one or more instructions to invoke the at least one OS-level command based on the one or more instructions from the browser cookie install the new software application or install the updated software application on the user device; and modify the browser cookie stored on the user device based on an execution of the at least one of the one or more instructions of the browser cookie in order to store status information regarding the attempt install the new software application or install the updated software application.

7. The system of claim 6, wherein the processing device further operates to receive, at the web browser, an instruction to generate the browser cookie.

8. The system of claim 6, wherein the processing device modifies the browser cookie based on a successful execution of the at least one of the one or more instructions to install a new software application or install an updated software application.

9. The system of claim 6, wherein to modify the cookie is to modify the cookie based on an unsuccessful execution of the at least one of the one or more instructions to install the new software application or install the updated software application.

10. A non-transitory computer readable medium having instructions stored thereon for executing an operating system (OS) level command to install a new software application or install an updated software application on a user device, that, when executed by a processor of the user device, cause the processor to perform operations comprising:

executing a web application in a web browser on the user device;

generating a browser cookie comprising one or more instructions to invoke at least one OS-level command to install the new software application or install the updated software application;

detecting the browser cookie;

storing the browser cookie on the user device;

analyzing the browser cookie stored on the user device to identify at least one of the one or more instructions;

validating the at least one of the one or more instructions by parsing the browser cookie to confirm that the one or more instructions conform to a proprietary syntax;

executing the identified at least one of the one or more instructions using the processor of the user device to invoke the at least one OS-level command based on the one or more instructions from the browser cookie to install the new software application or install the updated software application on the user device; and modifying the browser cookie stored on the user device using the processor of the user device based on an execution of the at least one of the one or more instructions of the browser cookie in order to store status information regarding the attempt to install the new software application or install the updated software application.

* * * * *